US009926810B2

(12) United States Patent
Mungas (10) Patent No.: US 9,926,810 B2
(45) Date of Patent: Mar. 27, 2018

(54) HIGH PERFORMANCE STEAM CYCLE

(71) Applicant: Gregory S. Mungas, Mojave, CA (US)

(72) Inventor: Gregory S. Mungas, Mojave, CA (US)

(73) Assignee: Carol F. Mungas, Sun City West, AZ (US)

( * ) Notice: Subject to any disclaimer, the term of this patent is extended or adjusted under 35 U.S.C. 154(b) by 0 days.

(21) Appl. No.: 14/216,408

(22) Filed: Mar. 17, 2014

(65) Prior Publication Data
US 2014/0311147 A1    Oct. 23, 2014

Related U.S. Application Data

(60) Provisional application No. 61/790,705, filed on Mar. 15, 2013.

(51) Int. Cl.
| F01K 7/02 | (2006.01) |
| F01K 3/24 | (2006.01) |
| F01K 23/06 | (2006.01) |
| F22B 27/00 | (2006.01) |

(52) U.S. Cl.
CPC .............. F01K 7/025 (2013.01); F01K 3/242 (2013.01); F01K 23/06 (2013.01); F22B 27/00 (2013.01); Y02E 20/16 (2013.01)

(58) Field of Classification Search
CPC .......... F01K 23/06; F01K 3/242; F01K 7/025; F01K 27/00; Y02E 20/16
USPC .......................................... 60/615, 653, 671
See application file for complete search history.

(56) References Cited

U.S. PATENT DOCUMENTS

| 4,406,127 A * | 9/1983 | Dunn | ........................ F02G 5/02 60/321 |
| 5,946,916 A * | 9/1999 | Ven | ........................ F01B 17/00 60/618 |
| 2002/0195437 A1* | 12/2002 | Kusuda | ............. H01L 21/67115 219/390 |
| 2011/0030373 A1* | 2/2011 | Brookman | .............. F01K 15/02 60/646 |

FOREIGN PATENT DOCUMENTS

| RU | 2129661 C1 | 4/1999 | |
| SU | 1301 A1 | 9/1924 | |
| WO | 2010132249 A1 | 11/2010 | |
| WO | WO 2010/132924 | * 11/2010 | ............... F01K 7/00 |

OTHER PUBLICATIONS

International Searching Authority, International Search Report and Written Opinion, PCT/US2014/030620, dated Aug. 7, 2014, 6 pages.

* cited by examiner

*Primary Examiner* — Mark Laurenzi
*Assistant Examiner* — Dapinder Singh
(74) *Attorney, Agent, or Firm* — Holzer Patel Drennan (57) ABSTRACT

Implementations described herein provide a high efficiency steam cycle that includes a steam turbine cycle coupled to output of a high performance steam piston topping (HPSPT) cycle. The HPSPT cycle includes a piston-cylinder assembly that extracts work from an expanding fluid volume and operates in a thermal regime outside of thermal operational limits of a steam turbine. The steam turbine cycle utilizes heat, transferred at the output of the HPSPT cycle, to generate turbine work.

34 Claims, 9 Drawing Sheets

HIGH PERFORMANCE STEAM CYCLE

CROSS-REFERENCE TO RELATED APPLICATIONS

The present application claims benefit to U.S. Provisional Application No. 61/790,705 filed on Mar. 15, 2013, which is specifically incorporated by reference for all that it discloses and teaches.

BACKGROUND

Greater than 80 percent of all U.S. electric power is currently generated from steam turbine cycles. Power cycle steam turbines process heat generated from combustion of hydrocarbon fuels (e.g., coal, natural gas) in a burner through a thermodynamic power cycle and convert the heat into useful work. The combustion of hydrocarbon fuels occurs at high temperatures, which may exceed 1900° C. However, steam turbine blades are exposed to high centripetal accelerations and may begin to creep and/or mechanically deteriorate when coupled with temperatures even significantly lower than the turbine blade melting point.

To protect the heat-sensitive turbine blades, higher mass flow rates of water are typically utilized in a burner heat exchanger to convert heat from the burner into a lower temperature (<650° C.) steam as compared to the combustion gas temperatures. As a result, steam engines often have lower theoretical Carnot cycle thermodynamic efficiencies as well as real thermodynamic efficiencies than could be achieved if the highest temperature of the cycle was closer to the temperatures of the combustion gases in the burner. Typically, thermodynamic efficiencies for converting heat into useful work (e.g., electricity) in these conventional steam turbine cycles is less than 50 percent and may be more commonly 35-42 percent.

Some existing steam applications combine two or more thermodynamic cycles to increase thermodynamic efficiencies. For example, Combined Cycle Gas Turbine (CCGT) systems have achieved cycle efficiencies of ~60% utilizing a gas turbine Brayton thermodynamic cycle for the "topping" cycle (i.e., the first highest temperature cycle in the overall thermodynamic power conversion system). However, these gas turbine "topping" cycles operate from combustion of a gas, and thus require either a gas fuel source or additional steps for producing gas fuels from solid hydrocarbon fuels.

It is theoretically possible to enhance the overall thermodynamic power cycle efficiency using a "bottoming" cycle (i.e., the lowest temperature cycle in the overall thermodynamic power conversion system) that operates from waste heat of turbines. However, such cycles are typically uneconomical because of very large, expensive equipment needed to extract energy from the small temperatures differences between condensing steam and outside air and/or water. This infrastructure and operating cost is typically high relative to the quantity and value of power produced from the low quality (i.e. low temperature) heat.

SUMMARY

Among other things, implementations described and claimed herein address the forgoing by providing coupling a steam turbine cycle to output of a high performance steam power topping (HPSPT) cycle (i.e., a "topping" cycle). The HPSPT cycle is designed to operate below the pressure and temperature limits of water chemical dissociation, but above a thermal regime of the steam turbine cycle. According to one implementation, the HPSPT cycle utilizes a piston-cylinder assembly that extracts work from an expanding fluid volume. A power stroke of a piston is initiated by the injection of a high-pressure, flash-heated steam. The steam is ejected from the piston-cylinder assembly by an exhaust stroke, and heat from the ejected steam is used to power a steam turbine.

These and various other features and advantages will be apparent from a reading of the following detailed description of implementations described and recited herein.

BRIEF DESCRIPTIONS OF THE DRAWINGS

A further understanding of the nature and advantages of the present technology may be realized by reference to the figures, which are described in the remaining portion of the specification.

DETAILED DESCRIPTION

Figure 1:
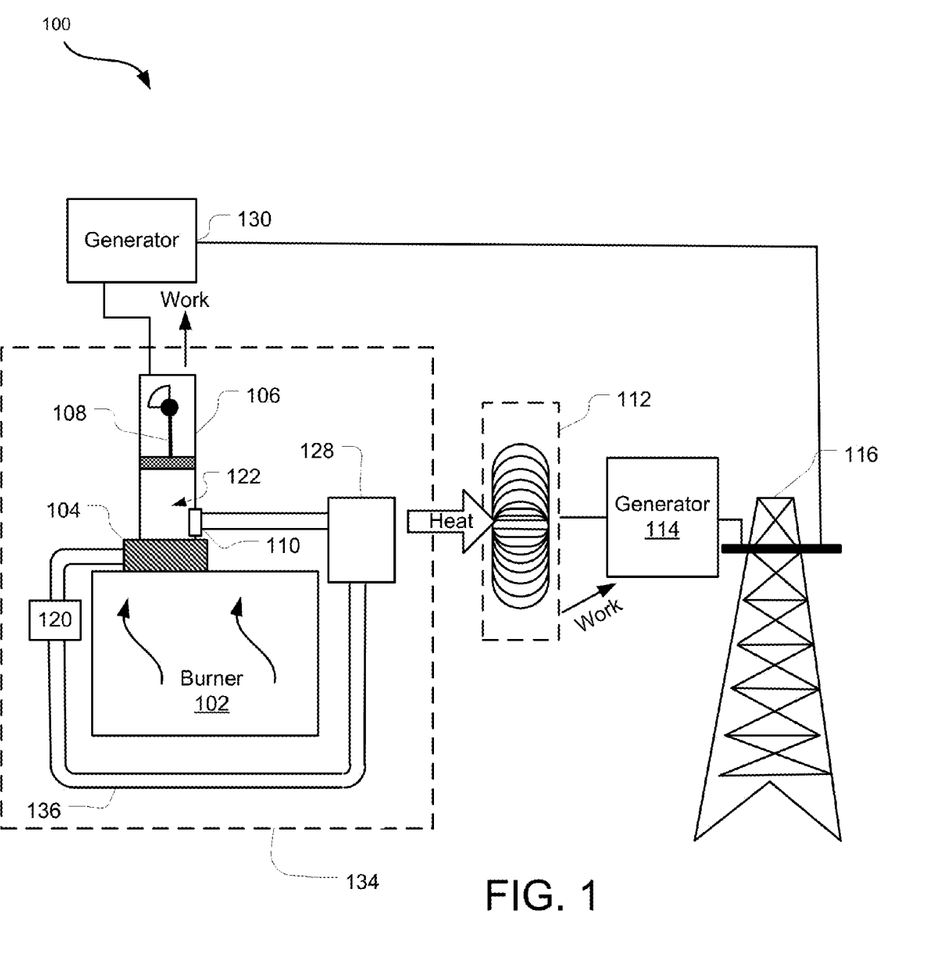
FIG. 1 illustrates machinery for implementing an example high performance steam power topping (HPSPT) cycle.

FIG. 1 illustrates machinery 100 for implementing an example high performance steam power topping (HPSPT) cycle 134 coupled to a steam turbine cycle 112, the integrated system of which converts energy from a first form into another at a high thermodynamic efficiency. In the HPSPT cycle 134, a burner 102 is thermally coupled to a flash-heating steam injector 104 incorporating a high temperature heat exchanger (not shown). The burner 102 heats components of the flash-heating steam injector 104 to a high temperature that is, in various implementations, between about 650° C. and up above 1400° C.

Using the heat of the burner 102, the flash-heating steam injector 104 flash-heats pressurized water into a very high temperature gas (e.g., steam). As used herein, "flash heating" refers to heating upon contact that happens at rates approaching combustion rates in internal combustion engines (e.g., in timescales less than about 100 milliseconds). Depending on design criteria, the flash-heating steam injector 104 may flash heat the pressurized water to a range of temperatures including those between about 650° C. and 1400° C., for example.

In some implementations, the flash-heating steam injector 104 includes a micro-fluidic heat exchanger that transfers the heat originally provided by the burner 102 to the pressurized water at small dimensional scales (e.g., ~10 micron pore diameter scales). In one such implementation, a micro-fluidic heat exchanger includes a number of embedded closed fluid passageways for local heat transmission to one or more holes (e.g., pores) where water can be flash-heated into steam or steam can be flash-heated into higher temperature steam. The micro-fluidic heat exchanger may include one or more thin microscreens. In one implementation, these thin microscreens are greater than or about (i.e., +/−10%) 75 microns thick. In one implementation, many stacks of thin microscreens are utilized to efficiently transfer heat from combustion gases to water. In one implementation, foils immediately above and below a microscreen have solid structure designed to efficiently conduct and distribute heat into the microscreen in close proximity to where heating of the fluid is occurring with a microscreen pore (down to about 10 micron scales). In one implementation, secondary fluid passageways are utilized to transfer heat from combustion gases to flash-heating pores. In other implementations, larger pores are used to flash-heat the fluid to produce high temperature gas very rapidly.

Typically, the higher the pressure drop across a heat exchanger, the faster the fluid being heated may transit between the inlet and outlet of the heat exchanger due to higher fluid velocities and/or smaller length scales for the heat exchanger for a given transfer of heat. In one implementation, the pressure drop across the microfluidic heat exchanger is less than about 1000 psid. In other implementations, the pressure drop across the microfluidic heat exchanger is less than about 100 psid. In yet another implementation, the pressure drop across the microfluidic heat exchanger may be less than about 10 psid.

In another implementation, the microfluidic heat exchanger includes porous features with a cross-sectional pore designed to be monotonically increasing. For example, the micro-fluidic heat exchanger may include conical-shaped pore features to provide for conical expansion from inlet to output to help achieve relatively constant pressure heat addition to the water as the fluid tries to volumetrically expand. These conical-shaped expansion features may allow for a reduction in the density of the water as it is heated without creating substantial pressure drop due to the lower density heated fluid. In addition, conical-shaped expansion features may help to ensure that sonic mass flow "choking" does not occur in the pore during rapid flows through the pores with large pressure drop. This "choking" phenomenon occurs when the gas velocities in a pore approach the local speed of sound in the fluid. At this point, the mass flow rate of fluid through the pore is not readily increased without increasing the upstream pressure. Such "choking" may cause pressure spikes in the pores during fluid boiling in the pore that may cause physical damage to the pores and/or micro-fluidic heat exchanger.

Other implementations may involve different pore geometries and geometric scales in order to optimally couple heat into the fluid while minimizing pressure drop through the flash-heating steam injector 104.

The high temperature flash-heating steam injector 104 is adjacent and physically coupled to a piston-cylinder assembly 106. The piston-cylinder assembly 106 is adapted to provide for movement of a piston 108 inside the piston-cylinder assembly 106 with minimal friction. The piston-cylinder assembly 106 may be made of materials including without limitation ferrous and non-ferrous metals and their alloys, carbon and/or carbon composite materials, etc. In one implementation, a lower end of the piston-cylinder assembly 106 (an inverted piston configuration) is attached to an insulated head block (not shown) that may house the micro-fluidic heat exchanger.

The high-pressure pump 120 provides a source of pressure for subsequent injection of high-pressure water into the flash-heating steam injector 104. In one implementation, the high-pressure pump 120 pumps liquid water. In another implementation, the high-pressure pump 120 is a compressor that pumps gas or a combination of liquid and gas (e.g., if the pressure and temperature within a fluid loop 136 are such that the water is in gas form). In yet another implementation, the high-pressure pump 120 pumps supercritical water. The high-pressure pump 120 may be designed to pump the water up to pressures that provide for a phase change within the piston-cylinder assembly, accounting for a minor pressure drop through the flash-heating steam injector 104. In one implementation, the high-pressure pump 120 is designed to pump supercritical water (e.g. water at >374° C.) to higher pressures.

Temperatures at the inlet to the high-pressure pump 120 may vary, but in some implementations are at or below about 374° C. In other implementations, temperatures at the inlet to the high-pressure pump 120 are above 374° C. The pump work in pressurizing the fluid may heat the fluid. For implementations where the temperature at the outlet of the high-pressure pump is above 374° C., the high-pressure pump 120 may be designed to handle supercritical water.

Pressures at the inlet to the high-pressure pump 120 also vary from one implementation to another. In one implementation, water pressure at the inlet to the high-pressure pump 120 is at or below 1 ATM. In another implementation, the pressure at the inlet to the pump is less than 3000 psia.

The high-pressure pump 120 pressurizes the fluid to accommodate the pressure drop losses in the fluid system to the flash-heating steam injector 104, the pressure drop across the flash-heating steam injector 104, the pressure drop associated with the piston expansion work, and the pressure drop losses through the fluid system back to the inlet side of the pump. The high-pressure pump 120 is operable to pressurize the water up to a pressure that is between about 100 psia and about 10,000 psia, depending on the implementation. In one example implementation, the high-pressure pump 120 pressurizes the water up to about 2000 psia.

The high-pressure water passes through the flash-heating steam injector 104 where the water very rapidly expands into a chamber 122 of the piston-cylinder assembly 106. In some implementations, the water transforms from a liquid to a hot steam when flash heated by the flash-heating steam injector 104. In other implementations, the water is in a gas form both before and after encountering the flash-heating steam injector 104. In yet another implementation, the water is in a supercritical fluid state after encountering the flash-heating steam injector 104. In yet another implementation, the water is in a supercritical fluid state before encountering the flash-heating steam injector 104.

An intake valve (not shown) on the piston-cylinder assembly 106 opens to allow for the injection of the steam into the chamber 122. In one implementation, the intake valve has an opening and closing time that is less than 10% of half the period of the piston cycle. In other implementations, the intake valve has an opening and closing time that is less than half the period of the piston cycle.

The pressure of the flash-heated steam varies in different implementations between about 100 psia up to as high as about 10,000 psia. In one example implementation, the pressure of the steam is ~2,000 psia immediately after the flash-heated steam is introduced into the piston-cylinder assembly 106 while the piston is near Top-Dead-Center.

In some implementations, the piston-cylinder assembly 106 operates under a two-stroke piston design. A power stroke of the piston 108 is initiated by the injection of the high-pressure, flash-heated steam into the piston-cylinder assembly 106. After injection of the steam, the piston continues the power stroke by allowing the steam to expand within the chamber, converting thermal energy from the steam into pressure-volume (PV) mechanical work, which is work that occurs when the volume of a system changes. This piston expansion reduces both the cylinder pressure and temperature. This power stroke is somewhat analogous to the power stroke in a diesel cycle, which has a slow burning, nearly constant pressure combustion phase and then an isentropic expansion phase in the power stroke. However, unlike the 4-stroke diesel cycle, a compression stroke (normally used to increase a fuel/air charge density and promote ignition) may not be included in the HPSPT case.

The second and final stroke for the high performance steam cycle is an exhaust stroke that pushes the cooled steam out of the piston-cylinder assembly 106 through a piston engine exhaust port 110. In one implementation, the cooled steam is about 650° C. In another implementation, the cooled steam is less than about 650° C.

Condensation of substantial water during the piston power stroke may be a cause for concern on the wear and reliability of the mechanical system. In various implementations, the steam exiting the piston engine exhaust port 110 is a pure gas, a saturated gas, or a two-phase fluid with a steam quality (percent gas by total mass) greater than 50%.

The piston-cylinder assembly 106 is capable of operating in a temperature regime outside of the thermal operational limits of a conventional steam turbine. In particular, steam entering the piston-cylinder assembly 106 is of a temperature in excess of 650° C., which is a temperature that causes mechanical deterioration of turbine blades in conventional turbines. In various implementations, the steam entering the piston-cylinder assembly 106 may be as hot or hotter than 1400° C.

The exhaust conditions of the piston-cylinder assembly 106 may be designed to match inlet conditions of conventional turbines (e.g., <650° C.). Steam may be permitted to expand and cool within the chamber 122 so that it can be partially or fully injected into a conventional steam turbine cycle. In one implementation, the steam exiting the exhaust port 110 is injected into a conventional turbine of the steam turbine cycle 112, where it is used to generate turbine work. The injection of the steam into the steam turbine cycle may be at pressures slightly higher than a typical inlet pressure to the turbine (e.g. ~<1500 psia) to accommodate some pressure drop losses before the steam enters the turbine.

In the implementation of FIG. 1, the steam exiting the exhaust port 110 is not injected directly into a turbine of the steam turbine cycle 112. Rather, the steam is permitted to undergo additional expansion within the chamber 122 to increase the resulting pressure drop to a level below requisite inlet conditions for some existing turbines. By allowing for this increased pressure drop, additional thermal energy is converted into mechanical PV work, increasing the total work extracted by the HPSPT cycle 134 and the efficiency of the high performance steam cycle 100. In one implementation, this pressure exiting the exhaust port 110 is about atmospheric pressure. In yet another implementation, this pressure exiting the exhaust port 110 is below atmospheric pressure. Accommodating pressures below atmospheric pressure may require particularly well-sealed fluid systems exposed to these pressures in order to prevent contamination of the closed water loop with atmospheric gases.

After exiting the exhaust port 110, the steam is directed into a heat exchanger 128 and recycled via a water loop 136 to the pump 120. The heat exchanger 128 satisfies multiple functions. First, the heat exchanger 128 may (in some but not all implementations) condense the water of the HPSPT cycle 134 back into a liquid form in order to minimize the work required of the pump 120 to generate high-pressures in the beginning of the HPSPT cycle 134. In some implementations, condensation does not occur in the heat exchanger 128; however, the fluid density is still increased through cooling thereby reducing the required pump work to pressurize the fluid that is ultimately lost from the useful work generated by the cycle. Additionally, the heat exchanger 128 may simulate the function of a burner for the steam turbine cycle 112, allowing heat to be transferred to a working fluid of the steam turbine cycle 112 without pressure being communicated between the two systems.

Mechanical power from the piston-cylinder assembly 106 is converted into electricity, such as by a generator 130 coupled to the piston-cylinder assembly 106. In FIG. 1, the turbine of the steam turbine cycle 112 has a separate generator 114 for converting mechanical power into electricity. In another implementation, the shaft power from both the piston-cylinder assembly 106 and turbine of the steam turbine cycle 112 is coupled into a single generator.

Electric power from the generators 114 and 130 flow electricity via a power grid 116. In various implementations, the overall combusted fuel-to-electric power generation efficiency from all generators exceeds 40%-70% or higher.

In one implementation, the HPSPT cycle 134 is retroactively added to an existing steam power plant by matching the output temperature of the steam ejected from the piston-cylinder assembly 106 to the inlet steam temperature conditions of a steam turbine cycle operating in a separate closed fluid loop. In this scenario, similar temperature heat is communicated between both closed loop fluid systems while allowing for substantially different fluid pressures to be operated between the two closed loop fluid systems. In another implementation, the HPSPT cycle 134 is retroactively added to an existing steam power plant by matching the output conditions of the steam ejected from the piston-cylinder assembly 106 to the inlet conditions of a steam turbine cycle generated from a conventional burner. These scenarios allow the HPSPT cycle 134 to be retroactively added to existing power plants as an "upgrade" option for broad scale commercial adoption rather than having to cover the large non-recurring costs for a complete power plant overhaul.

In another implementation, the HPSPT cycle 134 is combined with another power conversion cycle (e.g. organic Rankine cycle, binary cycle, Kalina cycle) that is capable of processing lower temperature heat in to work.

In yet another implementation, the HPSPT cycle 134 operates independently of another power conversion cycle and is the single primary cycle for generating useful work from heat.

Figure 2:
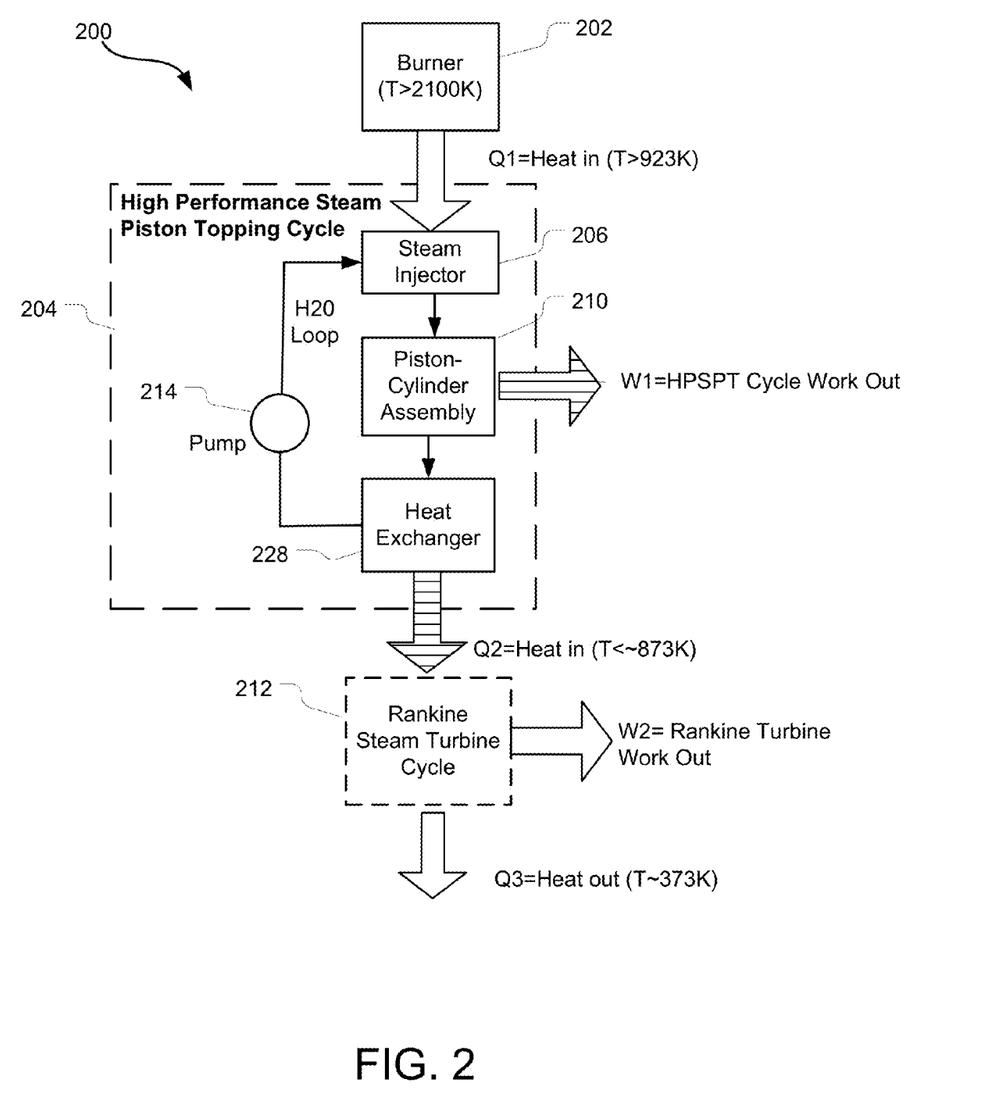
FIG. 2 illustrates an example flow diagram of a high performance steam power topping cycle integrated with a conventional steam power cycle.

FIG. 2 illustrates an example high performance steam cycle 200 that includes both a high performance steam piston topping (HPSPT) cycle 204 and a steam turbine cycle 212, which is a typical Rankine steam turbine cycle. A burner 202 is thermally coupled to a flash-heating steam injector 206 that flash heats liquid water into high temperature steam at rates approaching combustion rates of energetic fluids inside internal combustion engines. The burner may operate at a temperature greater than about 2100K. In some implementations, an equivalent heat source to a burner may operate at temperatures >923K.

To ensure high efficiency utilization of available burner heat for power conversion with the HPSPT cycle, it may be desirable in some implementations to cool the combustion gases from the burner to the lowest temperatures feasible. These lower bounding temperatures on the combustion gases may be limited by the temperatures of condensate that form in the combustion gases that could occlude heat exchanger pathways, chemical reactions that produce caustic combustion gas chemistry at lower temperatures, or other considerations such as the heat exchanger inlet temperatures for the water loop. In some cases, multi-stage heat exchangers may be desirable in order to allow for additional cooling from different water loops from cooler portions of the overall power cycle (e.g. steam turbine loop).

The heat collected from the hot combustion gases is transferred into the flash-heating steam injector 206. In one implementation, the thermal coupling between the burner 202 and the flash-heating steam injector 206 is a direct coupling where the hot burner combustion gases are transferred in close proximity to the flash-heating steam injector 206 to provide the heat and temperature of the heat for use in the flash-heating steam injector 206. For example, the thermal coupling between the hot combustion gases and the flash-heating steam injector 206 may be a conductor that has a radial pattern of manifold passages that have high heat-transfer coefficients that conduct heat from the combustion gases. Ribs around the manifold passages conduct heat to micro-screen films that transfer the heat to the water.

In another implementation, the thermal coupling between the burner 202 and the flash-heating steam injector 206 is an indirect coupling via a high temperature fluid exchange loop (not shown) that flows a high temperature working fluid (e.g., a working fluid metal) such as, for example, mercury or aluminum. Alternatively, another working fluid that does not break down at the elevated temperatures may also be used. In some implementations, supercritical water may be used as this intermediary heat transfer fluid. Micro-fluidic passageways may be used to distribute heat locally down to dimensional scales less than 1 mm and in some cases approaching 1 micron. In one such implementation, the fluid exchange loop between the burner and the flash-heating steam injector 206 maintains a mass flow rate of heat exchange fluid in order to deliver heat to the flash-heating steam injector 206 such that the flash-heating steam injector 206 may deliver flash-heated steam at a temperature of approximately 1400° C. In this or another implementation, the fluid loop delivers heat to allow the water entering the flash-heating steam injector 206 to be heated to a temperature greater than about 1200° C.

In yet another implementation, the indirect coupling between the burner 202 and the flash-heating steam injector 206 is a fluid exchange loop that is run at a relatively low mass flow rate to allow high temperature heat (e.g., >650° C.) to be delivered to the flash-heating steam injector 206. Other methods of coupling the burner 202 to the flash-heating steam injector 206 are also contemplated.

The temperature of the thermal coupling between the burner 202 and the flash-heating steam injector 206 may influence the material choice for the flash-heating steam injector 206. For instance, a relatively low-cost material such as nickel, Hastelloy®, etc. may be used for the flash-heating steam injector 206 when the temperature of the thermal coupling (e.g., the fluid exchange loop) is less than or approximately 1200° C. In systems where the thermal coupling between the burner 202 and the flash-heating steam injector 206 exceeds 1200° C., a refractory metal may be used, including without limitation niobium, tantalum, molybdenum, tungsten, and rhenium. A variety of other materials are also suitable, including without limitation silicon carbine, tantalum carbide, and alloys of any of the above. High temperature coatings including but not limited to Silicon Carbide and other oxides and/or carbides may be used to extend the life of the flash-heating steam injector in the presence of the high steam heating temperatures in combination with air and water.

A pump 214 increases water pressure before the water is introduced into the flash-heating steam injector 206. Within the flash-heating steam injector 206, the water is flash-heated into steam by the micro-fluidic heat exchanger. In other implementations, the pump is a compressor that compresses steam in the water loop and a phase change does not occur within the flash-heating steam injector 206. In one implementation, the steam injector includes features that minimize a pressure drop so that the flash-heating occurs at a near constant pressure.

The flash-heating steam injector 206 flash heats the water (e.g., into steam) and injects the steam into a cylinder (not shown) of a piston cylinder assembly 210, initiating a power stroke of a piston, which extracts work from the HPSPT cycle 204. The power stroke of the piston is continued by expansion of the steam within the chamber in a near isentropic expansion process. In this isentropic expansion, additional piston work is extracted, the steam is cooled, and pressure in the cylinder is reduced. Thus, thermal power of the steam is ultimately converted into mechanical energy (PV work, shown as "W1") thereby reducing the temperature of the steam.

In one implementation, the steam exits an output valve of the piston cylinder assembly 210 when it is of a temperature and pressure compatible with inlet conditions of a steam-powered turbine (e.g., temperatures <650° C.). The steam output from the piston cylinder assembly 210 is fed directly into an intake loop of the steam turbine cycle 212, which uses the steam to power a steam turbine to extract additional work (W2).

Inlet conditions of a steam turbine cycle 212 may depend upon the design and material choice of an included steam-powered turbine; however, in one implementation, inlet conditions of the steam-power turbine are satisfied when the steam entering the steam-powered turbine is less than or equal to about 650° C. In this or another implementation, the steam from the HSPST cycle 212 is injected into the steam turbine cycle 212 at a pressure less than approximately 1500 psi.

If the inlet conditions of the steam turbine cycle 212 are comparable to normal operating conditions for a conventional steam turbine, the normal work output of the steam turbine cycle 212 (W2) remains substantially the same as if the steam turbine cycle 212 were not coupled to a HPSPT cycle 204. Yet, this work (W2) is, in the high performance steam cycle 200, augmented by the additional work output W1 of the HPSPT cycle 204. This increased combined cycle work output increases the overall thermodynamic cycle efficiency of the high performance steam cycle 200 to exceed the efficiency of conventional steam turbine cycles.

Rather than feeding steam output of the piston cylinder assembly 210 directly into an intake loop of the steam turbine cycle 212 (as described above), the implementation of FIG. 2 further increases the thermodynamic cycle efficiency of the high performance steam cycle 200 by coupling an output valve of the piston cylinder assembly 210 to a heat exchanger 228. The heat exchanger 228 provides a thermal coupling to the steam turbine cycle 212, allowing heat to be transferred to a working fluid of the steam turbine cycle 212 without pressure being communicated between the two systems.

Within the piston cylinder assembly 210, the steam is permitted to expand and reduce in pressure to conditions that may fall below those typically compatible with inlet conditions of steam-powered turbines. By allowing for this additional pressure drop, further work can be extracted from the HPSPT cycle 204. The heat exchanger 228 makes use of the cooled, expanded steam after it exits the piston cylinder assembly 210 by feeding the steam into a low-pressure steam loop that transfers heat from this low pressure loop to a high-pressure-steam loop to be used in the steam turbine cycle 212. In some implementations, the heat exchanger 228 condenses the water of the HPSPT cycle 204 back into a liquid form in order to minimize the work required of the pump 214 to generate high pressures in the beginning of the HPSPT cycle 204. In other implementations, the heat exchanger 228 cools the steam to increase its fluid density in order to minimize the worked required of the pump/compressor 214 to generate high pressures in the beginning of the HPSPT cycle 204.

The steam exiting the piston cylinder 210 is hot enough to drive heat into the steam for the steam turbine cycle 212. In one implementation, this temperature gradient between the steam exiting the piston-cylinder assembly 206 and the steam exiting the heat exchanger 228 on the steam turbine cycle side is less than approximately 10° C. In another implementation, this temperature gradient between the steam exiting the piston-cylinder assembly 206 and the steam exiting the heat exchanger on the steam turbine cycle side is less than approximately 100° C. In yet another implementation, this temperature gradient between the steam exiting the piston-cylinder assembly 206 and the steam exiting the heat exchanger on the steam turbine cycle side may be greater than 100° C. The steam turbine cycle 212 uses the heated steam from this heat exchanger to power a steam turbine to extract additional work (W2). Transferring the heat through a heat exchanger 228 in the above-described manner may result in an overall thermodynamic efficiency of the high performance steam cycle 200 that exceeds 60%.

A variety of different heat exchangers are contemplated for use in the heat exchanger 228. In one implementation, the heat exchanger 228 includes a counter-flow heat exchanger (either alone or in combination with other heat exchangers). The counter-flow heat exchanger transfers heat over a shallow gradient that allows the outlet temperature of the HPSPT cycle 204 in the heat exchanger 228 to approach the inlet temperature of the steam turbine cycle 212. This may help ensure minimal temperature margin is devoted to heat transfer operations as compared to generating useful work in one of the power conversion cycles.

A conventional counter flow heat exchanger can be used as the heat exchanger 228 to approximately swap the inlet and outlet temperatures between a vaporized or nearly vaporized fluid loop of the steam turbine cycle 212 and a fluid loop of the HPSPT cycle 204. To minimize temperature gradients between the fluid streams, mass flow rates may be balanced between the HPSPT cycle 204 and the steam turbine cycle 212. In some implementations, hardware of the steam turbine cycle 212 may be intentionally operated at lower than nominal temperatures to support optimizing the efficiency of the high performance steam cycle 200. In one implementation, the heat exchanger 228 transfers heat from a working fluid of the HPSPT cycle 204 to a fluid loop of the steam turbine cycle 212 that flows a pre-pressurized water stream with a high temperature boiling point. The pressure in one or both of the working fluids may be less than about 3500 psia. In one implementation, the outlet temperature of the HPSPT cycle 212 in the heat exchanger 228 is greater than 650° C. In another implementation, the outlet temperature of the HPSPT cycle 212 in the heat exchanger 228 is less than 650° C. In still another implementation, the outlet temperature of the HPSPT cycle 212 is less than 250° C. In still another implementation, the outlet temperature of the HPSPT cycle 212 is less than 150° C.

In other implementations, the heat exchanger 228 includes multiple heat exchangers. For example, a phase change heat exchanger may be used to handle a bulk of energy transfer that occurs between the HPSPT cycle 204 and the steam turbine cycle 212 when phase changes are underway and very little temperature changes are occurring between fluid streams of the two cycles.

In one such configuration, the heat exchanger 228 exchanges heat between a working fluid of the HPSPT cycle 204 and a working fluid of the steam turbine cycle 212. Within the heat exchanger 228, the working fluid of the HPSPT cycle 204 is maintained at a slightly higher pressure (0.1-10 psia) than the working fluid of the steam turbine cycle 212. This permits boiling to occur in the working fluid of the steam turbine cycle 212 the same time that condensation is occurring in the HPSPT cycle 204, while simultaneously providing a temperature gradient for driving heat from the HPSPT cycle 204 into the steam turbine cycle 212. Because of the potential for shallow temperature gradients within the heat exchanger 228, a high efficiency microfluidic heat exchanger may be suitable for this purpose.

In another implementation, an intermediary heat transfer fluid with different phase change characteristics is used between the HPSPT cycle 204 and the steam turbine cycle 212 to more optimally couple heat from the HPSPT cycle 204 to the steam turbine cycle 212 accounting for fluid phase changes.

Inclusion of the heat exchanger 228 may potentially allow for much greater piston expansion ratios without a constraint on pressure being supplied by inlet conditions of the steam turbine cycle 212. In one implementation, the pressure of the steam exiting an exhaust port of the piston cylinder assembly 210 is near atmospheric pressure. In another implementation, the pressure of the fluid exiting exhaust port of the piston cylinder assembly 210 and exiting the heat exchanger 228 in the HPSPT cycle 204 is greater than atmospheric pressure, which may help to avoid potential contamination of the water fluid stream through leak help maximize PV work extracted from the piston cylinder assembly 210. The cooled steam ejected from the piston cylinder assembly 210 is, in one implementation, greater than or approximately equal to about ~650° C. In another implementation, the cooled steam ejected from the piston cylinder assembly 210 is, less than about ~650° C.

In one implementation, heat or steam from the HPSPT thermodynamic cycle is provided to a low temperature power cycle for additional power conversion. As used herein, the term "low temperature power cycle" refers to a power cycle that operates at temperatures less than 700° C.

In one implementation, heat or steam from the HPSPT thermodynamic cycle is provided to a very low temperature power cycle for additional power conversion. As used herein, the term "very low temperature power cycle" refers to a power cycle that operates at temperatures less than 250° C.

Figure 3:
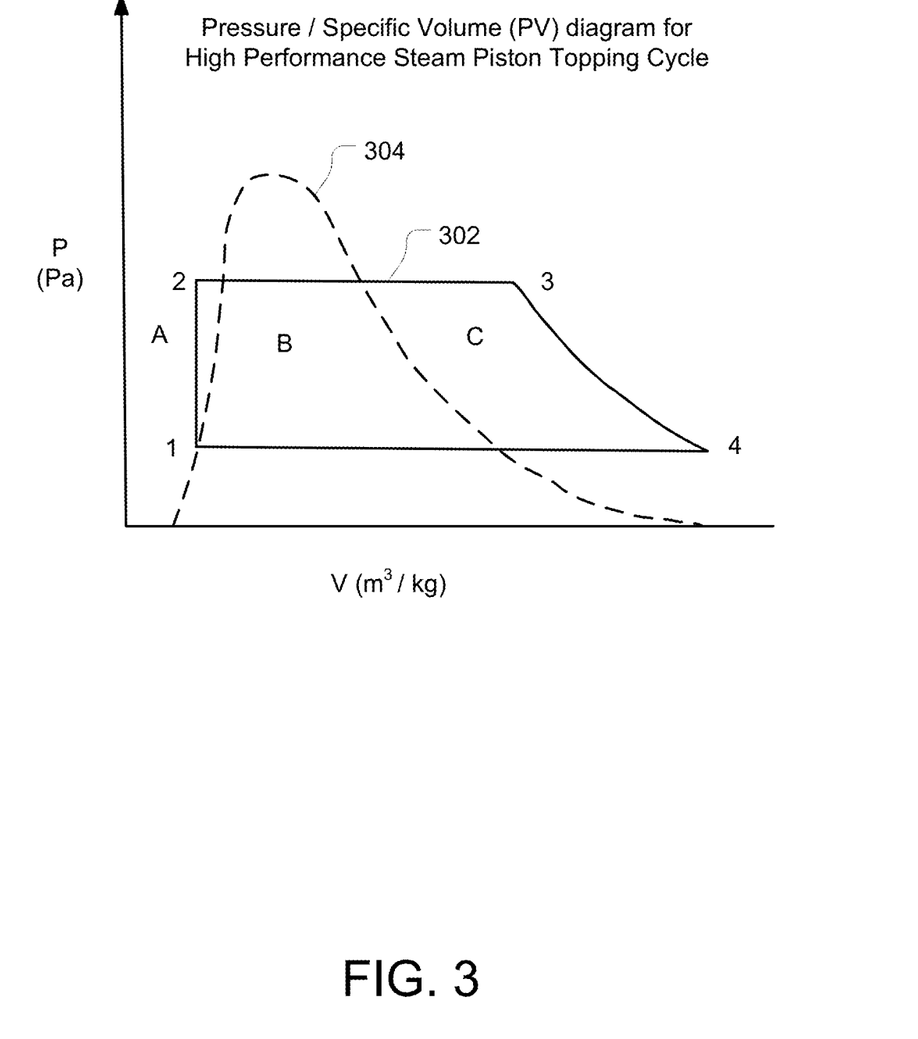
FIG. 3 illustrates an example PV (pressure/specific volume) diagram of an example HPSPT thermodynamic cycle.

FIG. 3 illustrates an exemplary PV (pressure/specific volume) diagram 302 of an HPSPT thermodynamic cycle that may be coupled to a steam turbine cycle (e.g., a Rankine cycle) to yield a higher work output than the steam turbine cycle alone. The PV diagram 302 is an idealized diagram. In practice, additional losses that increase entropy and cause fluid pressure drop in this thermodynamic cycle will slightly alter the shape of this PV diagram and reduce the overall work output produced from this cycle.

The exemplary PV diagram 302 is shown against a gas phase boundary line 304 for water, which divides the plot into regions A, B, and C respectively. In the region A, the pressure and volume of water is such that the water is a compressed liquid. In region B, the water is partially liquid and partially gas; in region C, the water is a pure gas (e.g., steam).

This illustrated cycle assumes an isentropic pump cycle for pressurizing the liquid water from State 1 to State 2. In one implementation, the transition between State 1 and State 2 occurs when a high-pressure pump pressurizes liquid water for injection into a piston-cylinder assembly.

Constant pressure heat addition is assumed between State 2 and State 3. In one implementation, the transition between State 2 and State 3 occurs when a microfluidic heat exchanger flash-heats liquid water into steam and injects the steam into a cylinder of a piston-cylinder assembly, allowing for rapid expansion.

An isentropic expansion process is assumed for the piston expansion process from State 3 to State 4. In one implementation, the transition between State 3 and State 4 occurs when steam injected into cylinder of piston-cylinder assembly continues to expand after initial injection into the cylinder, further driving the power stroke of the piston, and cooling the steam.

Finally, constant pressure condenser heat rejection is assumed from State 4 to State 1. In one implementation, the transition between State 4 and State 1 occurs when a condenser draws heat away from steam at a constant pressure, reducing the steam to a liquid. In one implementation, constant pressure heat rejection occurs from State 4 to State 1 with no condensation of liquid. In another implementation, constant pressure heat rejections occurs from State 4 to State 1 with partial condensation.

Figure 4:
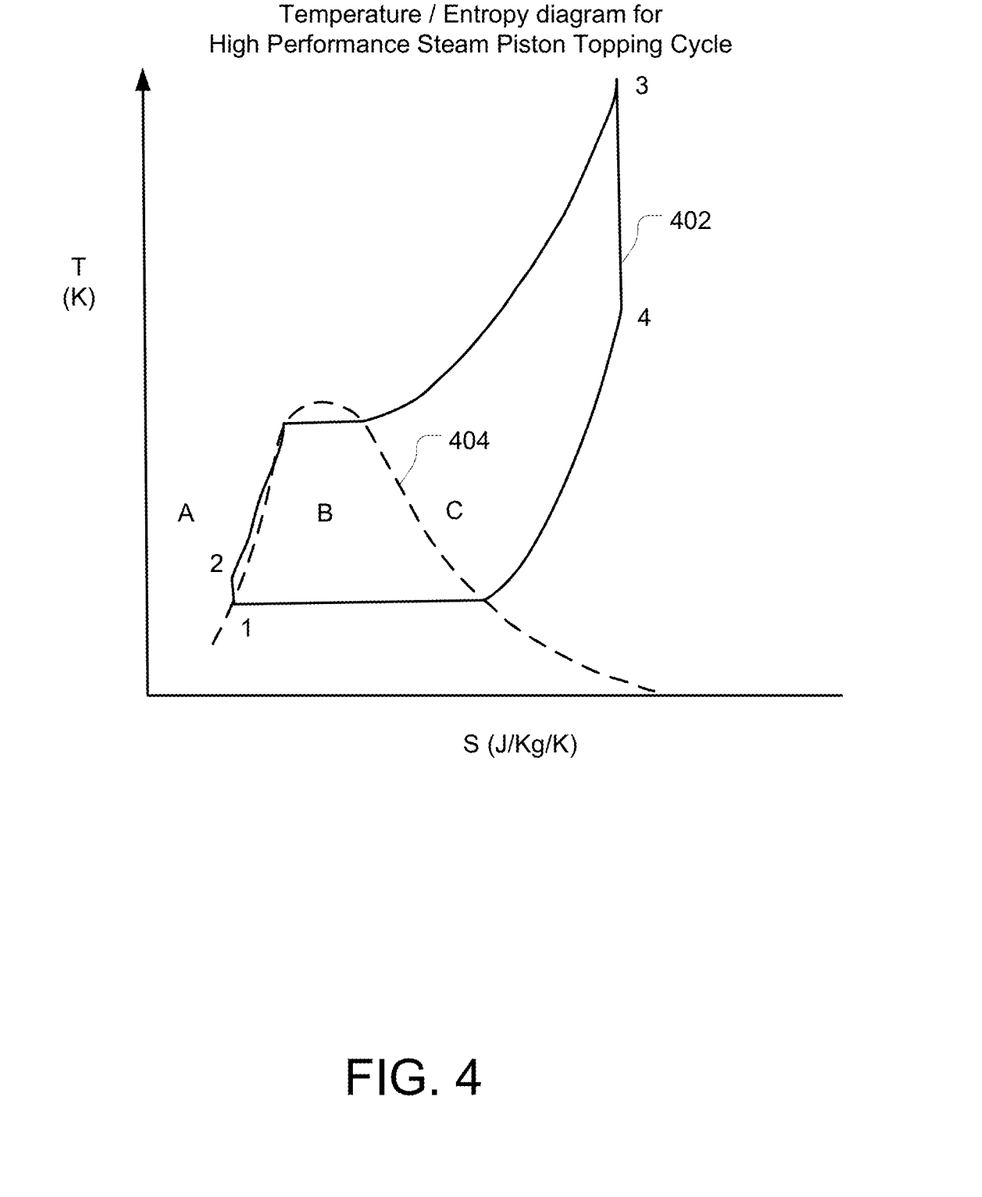
FIG. 4 illustrates an example TS diagram (temperature/entropy) diagram of an example HPSPT thermodynamic cycle.

FIG. 4 illustrates an exemplary Ts (temperature/specific entropy) diagram 402 of the HPSPT thermodynamic cycle against a gas phase boundary line 404. The numbered states (1-4) in FIG. 4 correspond to the numbered states in FIG. 3 and thermodynamic cycle assumptions as described above. The exemplary Ts diagram 402 is shown against a gas phase boundary line 404 for water, which divides the plot into regions A, B, and C respectively. In the region A, the pressure and volume of water is such that the water is a compressed liquid. In region B, the water is partially liquid and partially gas; in region C, the water is a pure gas (e.g., steam).

Figure 5:
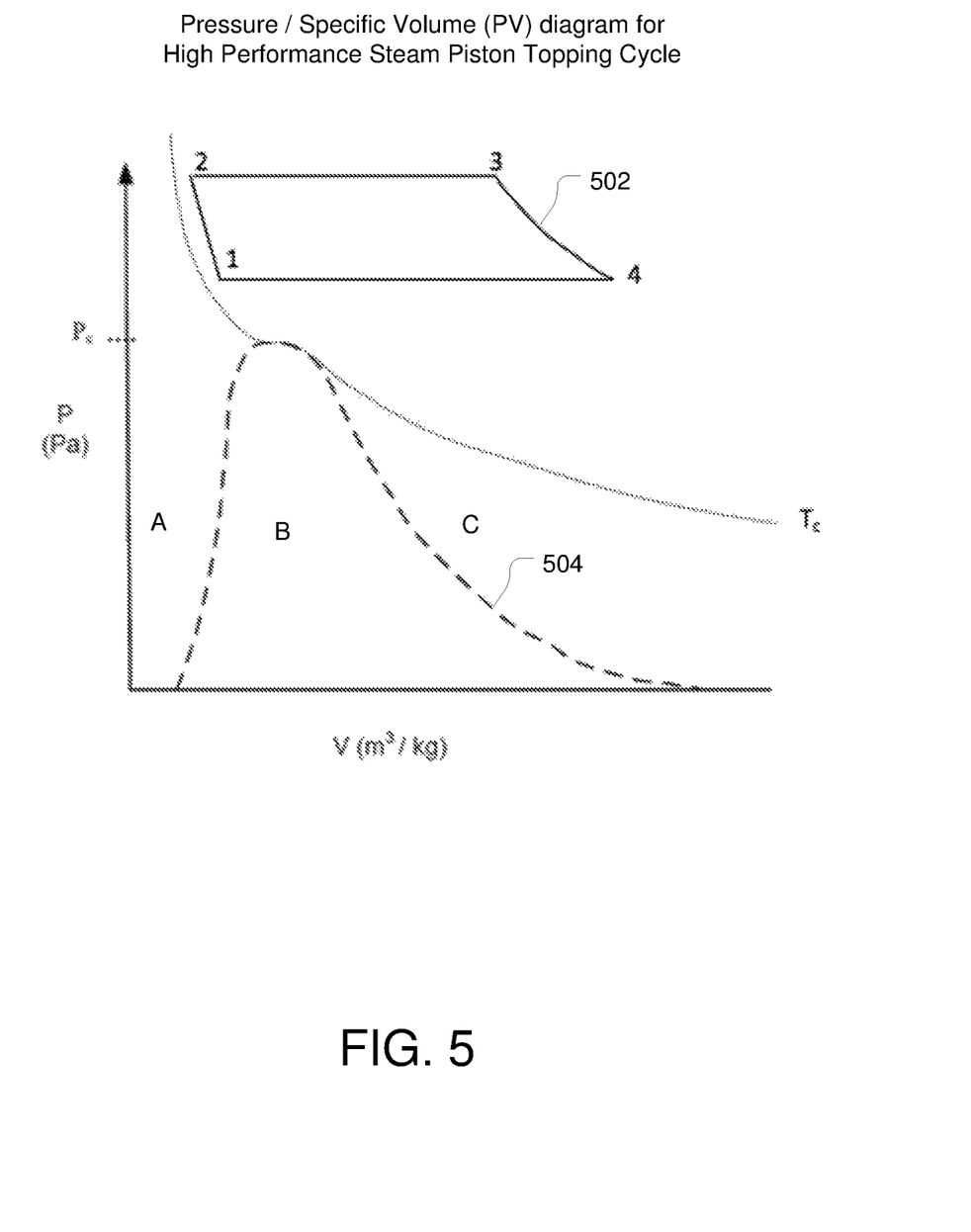
FIG. 5 illustrates a PV (pressure/specific volume) diagram of another example HPSPT thermodynamic cycle.

FIG. 5 illustrates another exemplary PV diagram 502 of an HPSPT thermodynamic cycle that may be coupled to a steam turbine cycle (e.g., a Rankine cycle) to yield a higher work output than the steam turbine cycle alone. The PV diagram 502 is an idealized diagram. In practice, additional losses that increase entropy and cause fluid pressure drop in this thermodynamic cycle will slightly alter the shape of this PV diagram and reduce the overall work output produced from this cycle.

The exemplary PV diagram 502 is shown against a gas phase boundary line 504 for water ($H_2O$), which divides the plot into regions A, B, and C respectively. In the region A, the pressure and volume of water is such that the water is a compressed liquid. A line of critical pressure ($P_c$) corresponds to the boiling point of water at a critical temperature ($T_c$) of the fluid. At and/or above the critical temperature, no heat of vaporization is required to produce a gas phase (e.g., steam) and liquid can no longer be present regardless of the pressure in the system. Thus, unlike the HPSPT cycle of FIG. 3, the HPSPT cycle of FIG. 5 occurs entirely when the water is in a supercritical fluid phase.

This illustrated cycle assumes an isentropic pump cycle for pressurizing steam from State 1 to State 2. State 1 corresponds to a point right before steam is pressurized by a high-pressure pump, and State 2 corresponds to a point after the steam is fully pressurized by the high pressure pump. Constant pressure heat addition is assumed between State 2 and State 3. In one implementation, the transition between State 2 and State 3 occurs when a microfluidic heat exchanger flash-heats the steam and injects the steam into a cylinder of a piston-cylinder assembly, allowing for rapid expansion.

As isentropic expansion process is assumed for the piston expansion process from State 3 to State 4. In one implementation, the transition between State 3 and State 4 occurs when steam injected into a cylinder of a piston-cylinder assembly continues to expand after initial injection into the cylinder, further driving the power stroke of the piston, and cooling the steam. Finally, constant pressure condenser heat rejection is assumed from State 4 to State 1. Unlike FIG. 3, the transition from State 4 to State 1 does not, in FIG. 5, represent condensation of the steam.

In one implementation where the HPSPT cycle is utilized by itself to generate useful work, flash-heated steam is injected into a piston-cylinder assembly at about 1400° C. and about 2000 psia. By allowing for a piston expansion ratio after complete steam injection of ~275:1, this steam may be cooled down to about 100° C. and about 0.1 atm. Neglecting losses, the overall thermodynamic conversion efficiency for this stand-alone cycle is about 50%. The remaining ~50% thermal energy is contained in the non-condensed, very low-pressure steam. In some implementations, heat from this non-condensed steam is drawn out with one or more heat exchangers to operate other very low temperature power cycles (e.g. organic Rankine, binary, Kalina) utilizing, for example, very low vapor pressure working fluids.

Figure 6:
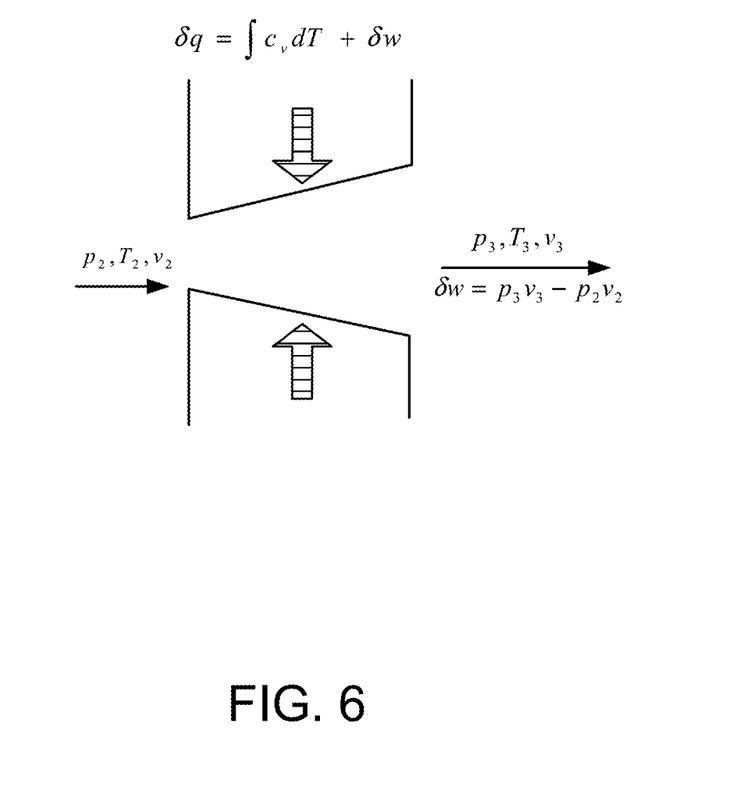
FIG. 6 illustrates an exemplary diagram of a micro-fluidic heat transfer pore incorporated into a steam injector head suitable for use in an HPSPT thermodynamic cycle.

FIG. 6 illustrates a conceptual conical heated expansion pore designed to minimize pressure drop and maximize heat transfer from a burner source into a water source for flash-heating steam. In one implementation, the illustrated expansion provides for the relatively constant pressure heat addition illustrated in FIGS. 3 and 5, in the transition between State 2 and State 3. In particular, FIG. 6 illustrates flash-heating fluid expansion of a fluid into a lower density (i.e., higher specific volume) fluid.

Figure 7:
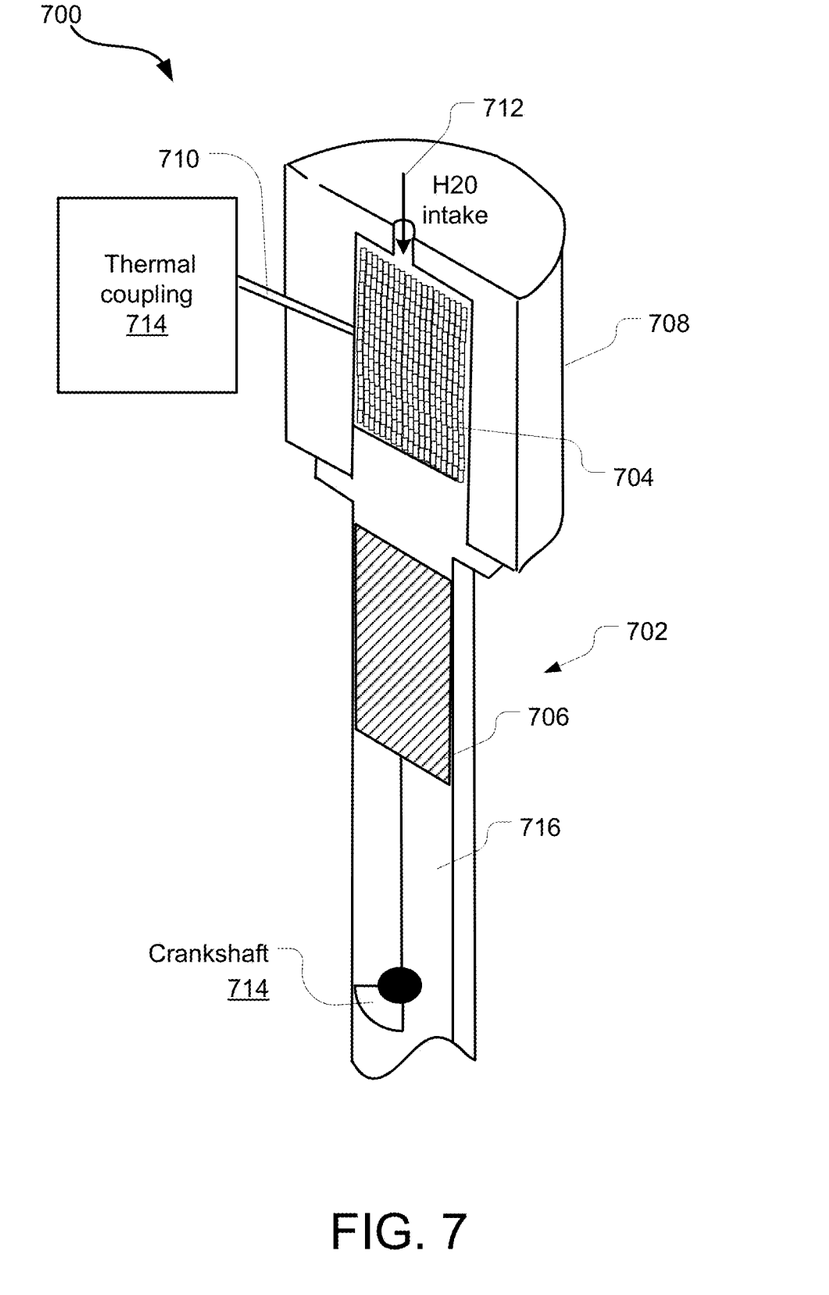
FIG. 7 illustrates an example piston-cylinder assembly attached to a flash-heating injector.

FIG. 7 illustrates a system 700 including example piston-cylinder assembly 702 attached to a flash-heating injector 708. Together, the piston-cylinder assembly 702 and the flash-heating injector 708 combine to convert heat energy, input to the flash-heating injector 708, into another form of energy (e.g., energy of a turning crankshaft 714). The flash-heating injector 708 houses a micro-fluidic heat exchanger 704 that is designed to flash-heat water to high temperature steam (>1200° C.).

A heat inlet 710 allows a source of heat to be input to the micro-fluidic heat exchanger 704 in the flash-heating injector 708. The flash-heating injector 708 receives steam from a fluid input port (e.g., a fluid input port 712) that has a fluid access anywhere inside the piston-cylinder assembly volume throughout the piston's range of motion. Various fluid passages of the micro-fluidic heat exchanger 704 are employed to transfer heat from a heat source fluid (e.g., a thermal coupling 714) to water flash-heated by the micro-fluidic heat exchanger 704.

In operation, water is injected into the flash-heating injector 708, where it is flash heated into the steam by the micro-fluidic heat exchanger 704. The flash-heated steam expands, driving a piston block 706 deeper into a cylinder 716. This expansion produces work that is extracted via a crankshaft 714.

Figure 8:
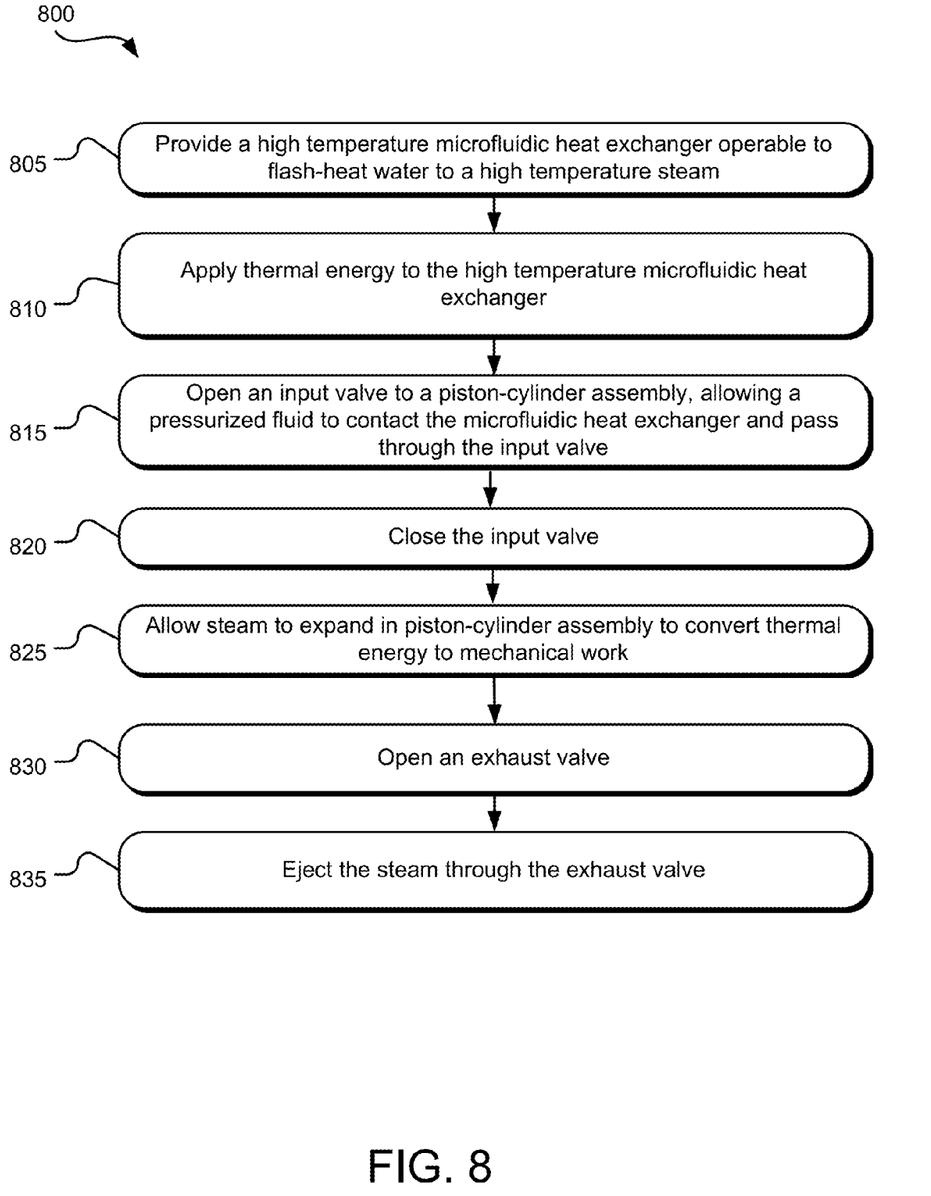
FIG. 8 illustrates example operations for an HPSPT cycle.

FIG. 8 illustrates example operations 800 for extracting work via an HPSPT cycle. A providing operation 805 provides a high temperature micro-fluidic heat exchanger operable to flash-heat water to high temperature steam. A heating operation 810 transfers heat to a high temperature micro-fluidic heat exchanger, and an opening operation 815 opens an input valve, allowing a pressurized fluid to come into thermal contact with the micro-fluidic heat exchanger and pass through the input valve. Upon contact, the flash-heating steam injector rapidly heats the pressurized fluid. In one implementation, highly-pressurized water <374° C. is pumped through the micro-fluidic heat exchanger, and the water is rapidly heated to a high temperature steam that is at or greater than about 650° C.

A closing operation 820 closes the input valve of the piston-cylinder assembly, and an expanding operation 825 allows the steam to expand within the cylinder, moving the piston, driving a crankshaft, and converting thermal energy to extractable work.

After such expansion, another opening operation 830 opens an output valve of the piston-cylinder assembly, and an ejecting operation 835 ejects the pressurized steam out through the exhaust valve. In one implementation, the ejected steam is run though a condenser to heat exchange its heat into a higher pressure steam loop feeding a conventional turbine or alternative power cycle. In another implementation, the steam ejected from the exhaust valve satisfies inlet conditions for a steam loop of a conventional turbine.

It should be noted that the operations 800 described with respect to FIG. 8 need not be strictly performed in the order illustrated. These operations may be reordered and/or performed concurrently, as appropriate to provide the desired efficiency of the steam engine cycle.

Figure 9:
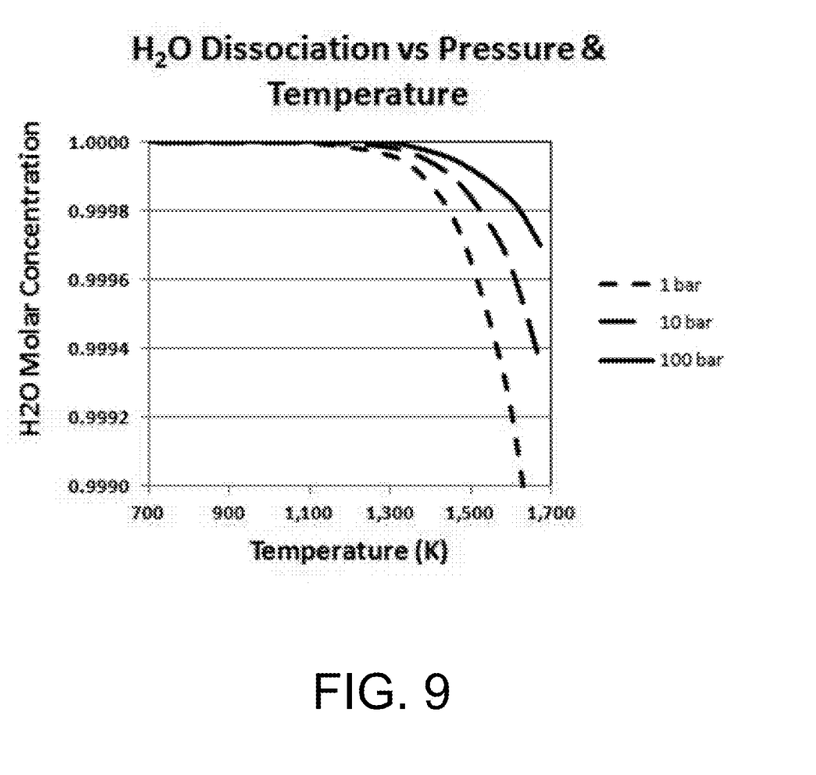
FIG. 9 illustrates a plot showing dissociation of water molecules with pressure and temperature.

FIG. 9 is a plot showing dissociation of water molecules with pressure and temperature. One factor limiting an operational temperature of a steam injector (e.g., for flash-heating water into steam) is the temperature at which the atoms in a water molecule chemically dissociate (~1500° C.). In general, water decomposition over pressure ranges typically seen in turbines occurs at temperatures much higher than conventional turbines currently operate. As demonstrated by FIG. 9, water can be heated to approximately 1400° C. (1673 K) with minimal dissociation of the water molecules. In one implementation of a HPSPTC cycle, the water is initially heated to a temperature less than 1400° C. (1673 K). During the piston expansion process where both pressure and temperature are reduced, the steam moves away from the PT dissociation boundary.

In the above description, for the purposes of explanation, numerous specific details are set forth in order to provide a though understanding of the present invention. It will be apparent, however, to one skilled in the art that the present invention may be practiced without some of these specific details. For example, while various features are ascribed to particular implementations, it should be appreciated that the features described with respect to one implementation may be incorporated with other implementations as well. By the same token, however, no single feature or features of any described implementations should be considered essential to the invention, as other implementations of the invention may omit such features.

The above specification, examples, and data together with the attached Exhibit provide a complete description of the structure and use of exemplary embodiments of the invention. Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A method for producing mechanical power, comprising:
    receiving, at a first heat exchanger, pulses of pressurized fluid from an injector, the first heat exchanger adapted to flash-heat the pulses of pressurized fluid to a first input temperature greater than 650 degrees Celsius for direct injection of the flash-heated fluid into a cylinder of a reciprocating piston; and
    operating the reciprocating piston to convert a portion of thermal energy of the flash-heated fluid volume into work.

2. The method of claim 1, further comprising:
    transferring, via a second heat exchanger, a portion of remaining non-converted thermal energy from a thermal output of the reciprocating piston to an input of a low temperature power cycle for conversion into work, the remaining non-converted thermal energy at a second temperature lower than the first input temperature.

3. The method of claim 2, wherein the low temperature power cycle is a steam turbine cycle.

4. The method of claim 2, wherein the transferring operation further comprises condensing a fluid volume output of the reciprocating piston.

5. The method of claim 1, wherein the first heat exchanger flash-heats the fluid volume in less than 100 milliseconds.

6. The method of claim 1, wherein the reciprocating piston converts the portion of the received thermal energy into work from a fluid volume by providing for expansion and cooling of the fluid volume.

7. The method of claim 1, further comprising:
    transferring, via direct fluid volume injection, a portion of remaining non-converted thermal energy from a thermal output of the reciprocating piston to an input of a low temperature power cycle for conversion into work, the remaining non-converted thermal energy at a second temperature lower than the first input temperature.

8. The method of claim 7, wherein the low temperature power cycle is a steam turbine cycle.

9. The method of claim 1, wherein the first heat exchanger is a micro-fluidic heat exchanger.

10. The method of claim 1 further comprising generating pressurized fluid via a high-pressure pump prior to forming pulses of the pressurized fluid from the injector.

11. A system comprising:
    an injector adapted to receive pressured fluid and provide pressurized fluid pulses;
    a flash-heat heat exchanger adapted to flash-heat the pressurized fluid pulses at an outlet pressure of at least 100 psia, the flash-heat heat exchanger directly coupled to a piston-cylinder assembly; and
    a reciprocating piston of the piston-cylinder assembly with an input coupled to an output of the flash-heat heat exchanger, the reciprocating piston adapted to accept the pressurized fluid pulses at a first temperature and at least 100 psia and to release the pressurized fluid pulses at a second temperature, the second temperature lower than the first temperature.

12. The system of claim 11, further comprising:
a thermal coupling that transfers heat from the released, pressurized fluid pulses to a low temperature power cycle to decrease the temperature of the pressurized fluid pulses down to a third temperature lower than the second temperature.

13. The system of claim 12, wherein the low temperature power cycle is a steam turbine cycle.

14. The system of claim 11, wherein at least one of the first temperature and the second temperature exceeds 650 degrees Celsius.

15. The system of claim 11 further comprising a high-pressure pump to provide the pressurized fluid.

16. The system of claim 15, wherein the high-pressure pump has a peak fluid pressure greater than about 500 psia.

17. The system of claim 11, wherein the first heat exchanger is a micro-fluidic heat exchanger.

18. A topping piston engine comprising:
a reciprocating piston;
a first heat exchanger coupled to a thermal energy input of the reciprocating piston; and
an injection valve upstream of the first heat exchanger adapted to receive pressurized fluid and provide pressurized fluid pulses synchronized with the reciprocating piston to the first heat exchanger;
the first heat exchanger adapted to flash-heat the fluid pulses; and
the reciprocating piston adapted to receive a quantity of thermal energy in the form of heated fluid mass from the first heat exchanger at a first input temperature greater than 650 degrees Celsius, the reciprocating piston converting a portion of the received thermal energy into work.

19. The topping piston engine of claim 18, wherein the first heat exchanger flash heats the fluid pulses in less than 100 milliseconds.

20. The topping piston engine of claim 18, wherein the reciprocating piston converts the portion of the received thermal energy into work by providing for expansion and cooling of a fluid volume.

21. The topping piston engine of claim 18, further comprising:
a second heat exchanger adapted to couple a thermal output of the reciprocating piston to a low temperature power cycle, wherein the second heat exchanger is adapted to transfer a portion of remaining non-converted thermal energy at a second temperature lower than the first input temperature to the low temperature power cycle for conversion into work.

22. The topping piston engine of claim 21, wherein the low temperature power cycle is a steam turbine cycle.

23. The topping piston engine of claim 21, wherein the second heat exchanger condenses a gas output of the reciprocating piston into a liquid.

24. The topping piston engine of claim 18, further comprising a high pressure pump to provide the pressurized fluid to the injector.

25. The topping piston engine of claim 18, further comprising:
an exhaust valve and a fluid conduit to couple a thermal output of the reciprocating piston to a low temperature power cycle, wherein the exhaust valve and the fluid conduit directly transfer a portion of remaining non-converted thermal energy at a second temperature lower than the first input temperature by directly transferring fluid volume to the low temperature power cycle for conversion into work.

26. The topping piston engine of claim 18, wherein the first heat exchanger is adapted to flash-heat the fluid pulses in timescales shorter than the duration of the power stroke of the reciprocating piston.

27. The topping piston engine of claim 26, wherein the first heat exchanger is adapted to flash-heat the fluid pulses in less than 10% of the duration of the power stroke of the reciprocating piston.

28. The topping piston engine of claim 18, wherein the first heat exchanger is a micro-fluidic heat exchanger.

29. The topping piston engine of claim 18 further comprising a high-pressure pump.

30. A thermodynamic power cycle method comprising:
using a thermal energy source greater than 650 degrees Celsius to heat a first working fluid to transfer thermal energy to a thermal engine as a thermal energy input to the thermal engine, the thermal engine capable of converting thermal energy to mechanical work;
generating pulses of a secondary working fluid via an injection valve and synchronizing the pulses of the secondary working fluid with a power generating period in the thermal engine;
transferring heat from the first working fluid to a micro-fluidic heat exchanger to flash-heat the pulses of the secondary working fluid to temperatures greater than 650 degrees Celsius in a time period less than the power generating period;
generating sufficient fluid pressure using a high-pressure pump to overcome the pressure drop of the pulses of the secondary fluid through the injection valve and the micro-fluidic heat exchanger while still providing sufficient fluid pressure to drive the power generating portion of the thermodynamic cycle in the thermal engine; and
converting a portion of the thermal energy contained in the pulses of the secondary working fluid into mechanical work through volumetric expansion of the secondary working fluid in the thermal engine.

31. The method of claim 30, wherein the thermal engine is a reciprocating piston engine.

32. The method of claim 30, wherein the secondary working fluid is exhausted from the thermal engine with a temperature to drive a secondary thermodynamic power cycle that operates at peak temperatures less than 650 degrees Celsius.

33. The method of claim 30, wherein the injection valve and the heat exchanger are adapted to flash-heat the pulses of a secondary working fluid in less than 10% of the duration of the power generating period.

34. The method of claim 30, wherein the high-pressure pump and the injection valve are adapted to function with the secondary working fluid in a compressed liquid phase.

* * * * *

UNITED STATES PATENT AND TRADEMARK OFFICE
CERTIFICATE OF CORRECTION

PATENT NO. : 9,926,810 B2
APPLICATION NO. : 14/216408
DATED : March 27, 2018
INVENTOR(S) : Gregory S. Mungas

Page 1 of 1

It is certified that error appears in the above-identified patent and that said Letters Patent is hereby corrected as shown below:

On the Title Page

Assignee: Replace Carol F. Mungas with Carol E. Mungas.

Signed and Sealed this
Fifteenth Day of May, 2018

Andrei Iancu
*Director of the United States Patent and Trademark Office*